Aug. 15, 1939.  G. W. CRABTREE  2,169,760

SPRING COVER

Filed June 27, 1936  2 Sheets-Sheet 1

INVENTOR.
GEORGE W. CRABTREE

BY

ATTORNEYS

Aug. 15, 1939.  G. W. CRABTREE  2,169,760
SPRING COVER
Filed June 27, 1936  2 Sheets-Sheet 2
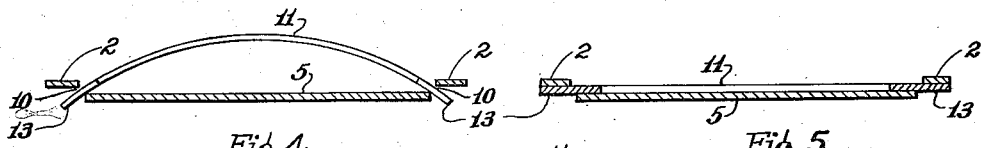
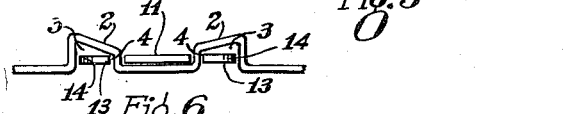
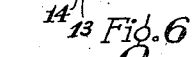
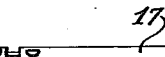
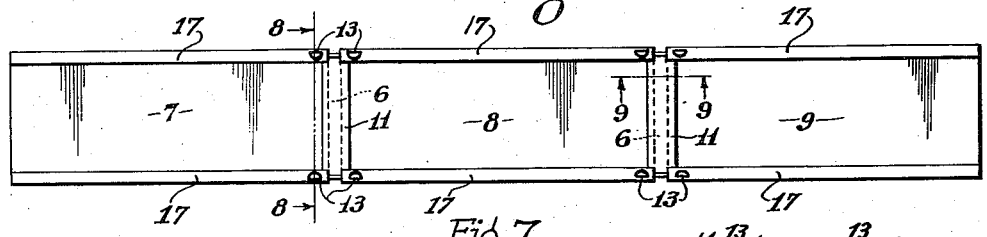
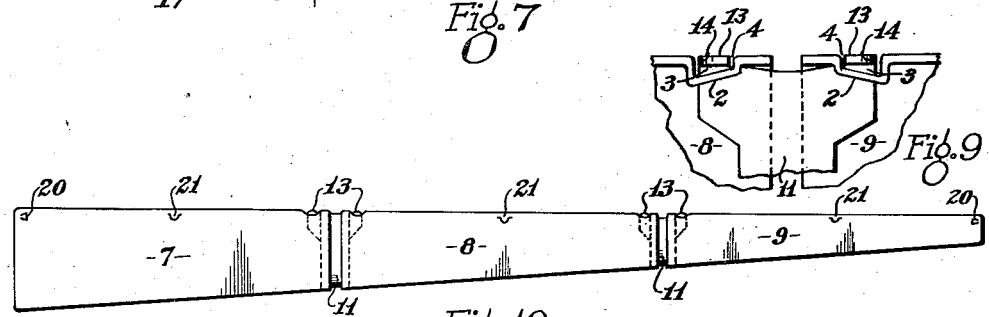
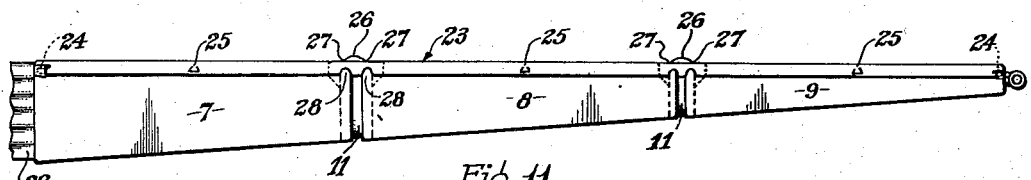
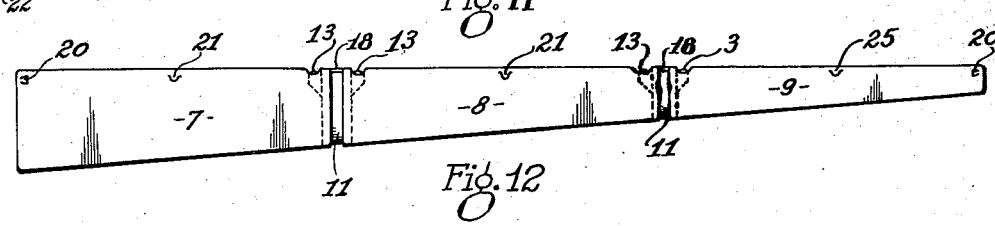
INVENTOR.
GEORGE W. CRABTREE
BY Richey & Watts
ATTORNEYS Patented Aug. 15, 1939

2,169,760

UNITED STATES PATENT OFFICE 2,169,760

SPRING COVER

George W. Crabtree, Cleveland Heights, Ohio

Application June 27, 1936, Serial No. 87,633

6 Claims. (Cl. 267—37)

This invention relates to improvements in covers for laminated vehicle springs and more particularly to a flexible metallic sectional type of cover and the method of making same.

It is among the objects of my invention to provide a metallic casing which is simple and rugged in construction, which will flex in response to spring movement and which may be formed in a manner which will effect considerable economy of materials and a saving in the cost of assembly. It is a further object of my invention to provide a spring cover according to the preceding object which is adapted for use with a one-piece spring cover cap constructed according to the disclosure in my Patent No. 2,095,859, filed October 12, 1937, Serial No. 71,889, filed March 31, 1936. More specifically it is an object of my invention to provide a spring cover having a plurality of body sections joined to each other by means overlapping each of said sections. It is a further object of my invention to provide a spring cover having a series of body sections connected to each other so as to flex longitudinally of the spring with respect to each other in response to spring movement about longitudinally spaced pivotal points. It is a further object of my invention to provide a method of forming a spring cover wherein a blank which ultimately forms a plurality of interconnected sections is shaped and combined with joining strips so as to effect a saving in the cost of the material of the cover and a saving in the cost of the shaping or handling of the parts of the cover. It is a further object of my invention to provide a spring cover comprising a combination of cover body and cover cap section in which the cap section has spaced localized flexing points and the body section has spaced pivotal points in alignment with said localized cap flexing points. It is also among the objects of my invention to provide a spring cover having a one-piece body composed of sections adapted to flex with respect to each other and a one-piece cap adapted to flex with said body sections in response to spring movement. Further objects and advantages relating to simplicity and economies of manufacture will appear from the following description and the accompanying drawings wherein:

Figure 4 is an enlarged sectional view showing the method of assembling the connector strips with the tapered blank;

Figure 5 is an enlarged view taken on the line 5—5 of Figure 3 and illustrates the connector strip as finally assembled with the tapered blank;

Figure 6 is an elevation on enlarged scale taken along the line 6—6 of Figure 3;

Figure 7 is a plan view of the blank and strips of Figure 3 subsequent to a shaping of the same into a longitudinal channel having a U-shaped cross section;

Figure 9 is an elevation on an enlarged scale with parts broken away, taken along the line 9—9 of Figure 7;

Figure 10 is a side elevation of the channel form body section of the cover;

Figure 11 is a side elevation illustrating the body section as arranged upon a vehicle spring and provided with a cap section;

Figure 12 is a side elevation of a modified form of spring cover body section.

Figure 1:
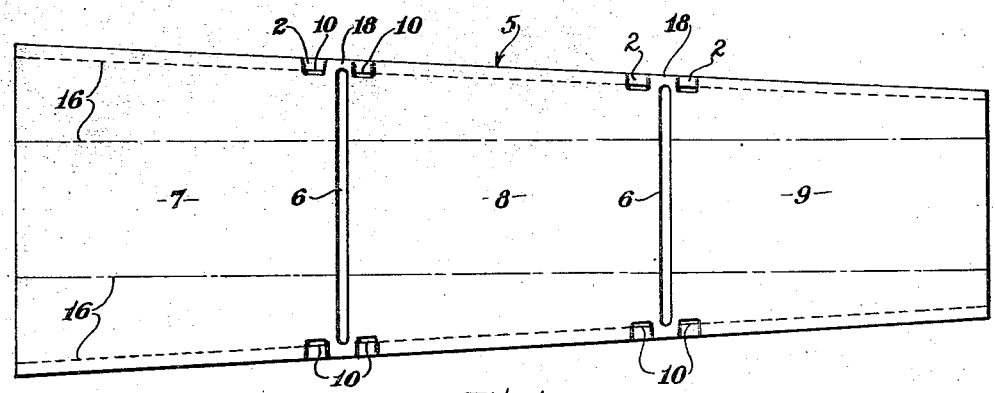
Figure 1 is a plan view of a tapered blank which ultimately forms the body sections of my cover.
Figure 2:
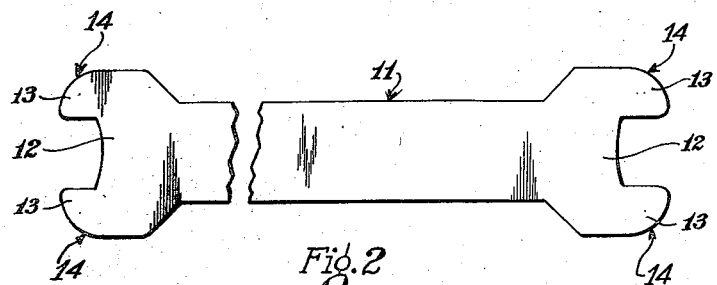
Figure 2 is a plan view of a connector strip employed in the manufacture of the cover.

The advantages of a spring cover comprising inter-connected or jointed section which will permit a flexing of the cover in response to spring movement and which will retain a lubricant about the vehicle spring are generally recognized and said advantages have resulted in a general acceptance by the automotive industry of this type of cover. Among the defects encountered in connection with the use of certain types of metallic spring covers is that associated with the more or less permanent attachment of the cover to the spring and associated with the time and labor expended to attach such types of covers to the spring.

In the event that it becomes necessary to replace a leaf of a laminated spring or a spring clip, it is desirable that the cover may be easily and quickly removed and also easily and quickly replaced following the repair or adjustment of the spring leaf parts. It is also desirable in a metallic spring cover having a plurality of body sections which may flex with respect to each other that the sections be effectively sealed where joined to each other so as to prevent the loss of lubricant from within the cover or the entrance of moisture through the joint between the sections.

According to my invention I attain the foregoing desirable objects and avoid the disadvantages referred to by a method which comprises generally stamping out a single metal blank which ultimately forms the sections of the body part of the cover and slotting this blank transversely intermediate the longitudinal marginal edges thereof. Subsequent to the slotting I prefer to cover the slots by strips which will be hereinafter referred to as connector strips inasmuch as they also perform the function of connecting the sections which form the body. Following the assembly of the blank and the connector strips, they are shaped to enclose three sides of a vehicle spring having a rectangular cross section and a cap is provided to co-operate therewith and form the fourth side of the cover.

Referring to the drawings (Figure 1) a tapered blank 5 of sheet metal or the like is provided having a length corresponding generally to the length of the vehicle spring which is to be enclosed and sufficient width so that when given a U-shape it may cover three sides of the vehicle spring. Preferably during the stamping out of the blank 5 a plurality of transverse slots 6 are formed which slots terminate adjacent the longitudinal marginal edge of the strip 5. The number of transverse slots 6 formed may be varied depending upon the length of the spring and the flexibility desired in the cover. The transverse slots 6 function to divide the longitudinal blank 5 into a series of spring cover body portions 7, 8 and 9 which may ultimately become separate sections of the body of the cover. The blank 5 is slotted as at 10 adjacent marginal edge thereof at each side of the transverse slot 6 during the blanking out operation. Preferably at the same time as the slotting at 10, the marginal edge portions 2 intermediate the slot and the edge of the blank are pressed upwardly out of the plane of the blank to form tongue receiving recesses 2. The shape of the recesses or bulges 2 as formed along the marginal edge of the blank near the slots 10, is best shown in Figure 6, and the wall thereof is inclined or sloped as shown in that figure for purposes more fully described hereinafter.

The connector strips 11 are preferably proportioned to have an over-all length exceeding the length of the transverse slots and a width sufficient to cover said slots when the sections 7, 8 and 9 are flexed with respect to each other in a manner more fully described hereinafter. The portions 12 of the connector strips 11 are preferably widened and are provided at their outer ends with prongs or tongues 13 cut away at their outer edges as at 14 which are adapted to be received by the similarly spaced apertures 10 and raised edge portions 2 of the blank 5. The strips 11 may be combined with a blank 5 in a manner illustrated in Figure 4 wherein the prongs 13 at one end of the strip are inserted in the holes 10 at one edge of the blank and the strip 11 "bowed" or curved intermediate its ends and the prongs 13 at the other end inserted through the apertures 10 at the other margin of the blank 5.

Figure 3:
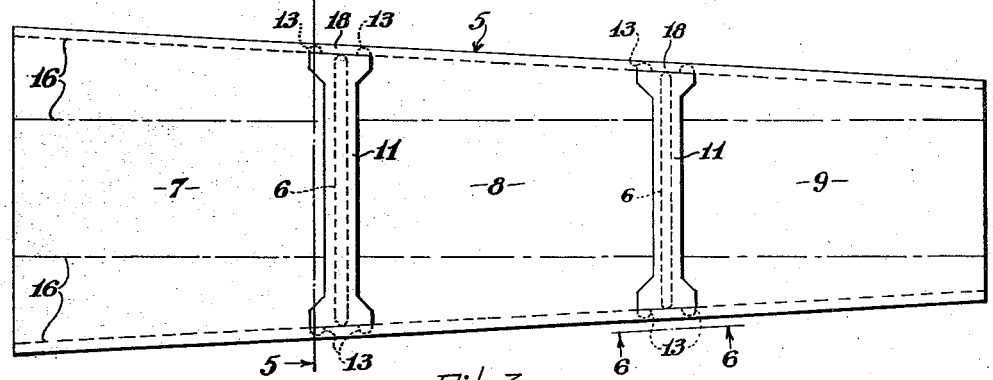
Figure 3 is a plan view of the connector strips and tapered blank showing the connections therebetween during a phase of the assembly of the parts of the cover.
Figure 8:
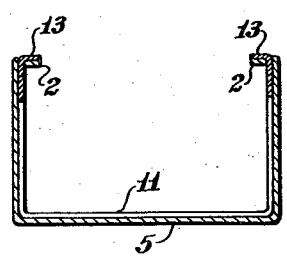
Figure 8 is a sectional view taken on the line 8—8 of Figure 7.

The assembly comprising the blank 5 and connector strips 11 is preferably bent along the fold lines 16 (Figure 3) to give the body section of the cover a channel shape having inturned edge flanges 17 as shown in Figure 7. During the forming of the blank into a channel having a U-shaped cross section that portion of the blank intermediate the ends of the slots 6 and the margin of the blank as indicated at 18 in Figures 1 and 3 is preferably cut away and thus the sections 7, 8 and 9 become separable sections connected only through the medium of the strips 11. The sections 7, 8 and 9 are normally spaced from each other a distance corresponding to the width of the slot 6. The bulged marginal edge portions 2 due to the U-shape of the blank 5 are arranged interiorly of the channel as shown in Figures 8 and 9, and the upper longitudinal edge of the body of the cover presents a substantially straight line as shown in Figure 10.

It will be observed by reference to Figures 6 and 9 that subsequent to the forming of the blank and strip assembly into channular shape the inner opposed edges of the tongues 13 will be positioned at the shallow part 4 of the bulge or recesses 2, and that the rounded or cut-away portion 14 on the outer edges of the tongues 13 is disposed at the deeper part of the bulge or recess 2. This arrangement in shaping and proportioning the parts causes the part 4 at the shallow part of the bulge 2 to function as a fulcrum point and the adjacent sections 8 and 9 are free to flex about this point as a pivot. The flexing action is permitted by reason of the space 3 and positioning of the cut-away tongue at 14 in the deeper part of the bulge or recess 2. The strip 11 is preferably rounded or cut away intermediate the tongues 13 so as to permit the adjoining free edges of the sections 8 and 9 to move downwardly with respect to the strip in response to a flexing of the spring.

Through the arrangement of parts above described the flexing between adjacent sections 8 and 9 is divided between two pivots, one pivot at 4 in each section, and thus the flexure with respect to each pivot is half the amount of flexure found in corresponding types of spring covers having a single pivot or flexing joint between adjoining sections.

It will be observed that the wide portion 12 of the connector strip 11 positions the tongues or prongs 13 away from the edge of the slot 6 and thus leaves ample material in the body sections 7 and 8 to anchor the tongues or prongs 13, whereas the narrowed intermediate portion of the strip 11 permits easy flexing movement between the strip and the sections.

Athough according to the preferred method of construction as above outlined the portions 18 of the blank 5 are removed subsequent to the U-shaping of the blank, it will be understood that the portions 18 may be removed as soon as the body sections 7, 8 and 9 are secured to each other by the connector strip 11. For instance when the blank is in its flat form as shown in Figure 3 the portions 18 may be removed since the sections 7, 8 and 9 are held in position with respect to each other by the strip 11.

It will also be understood by those skilled in the art that the portions 18 may remain integral with the blank and sections 7, 8 and 9 in that they correspond in width to the inturned flange 17 subsequent to the U-shaping of the body section and thus are disposed in a plane where it is not essential that there be any substantial movement between the sections. This last mentioned form of my invention is illustrated in Figure 12 wherein the portion 18 is retained integral with adjoining body sections 7, 8 and 9 and results in an integral one-piece body section.

Following the shaping of the blank 5 into channular form the body sections 7, 8 and 9 are provided with latching devices to co-operate with a cap section. Preferably the sections 7 and 9 are each provided with a recess 20 and the sections 7, 8 and 9 are provided with outstanding tongues or lugs 21 along the upper marginal edge thereof. The body sections may be assembled upon a laminated vehicle spring 22 as in Figure 11 and a flanged one-piece cap 23 constructed according to the teachings of my said copending application Serial No. 71,889 may be applied thereto. Longitudinally extending tongues 24 of the cap 23 are inserted into the apertures 20 of the body section and recesses 25 on the cap are adapted to receive the prongs or tongues 21 of the body section when the cap is forced downwardly into latching engagement therewith as more fully described in said copending application.

The flanged sides of the cap member 23 are cut away as at 28 and the top wall of the cap member is provided with a transverse rib 26 according to my said copending application and this construction causes the adjoining sections of the cap which overlie body sections 7, 8 and 9 to flex at the spaced points 27—27. It will be observed that in a spring cover wherein the body sections are made up as disclosed in the instant application and the cap member is made up according to the teachings of my said copending application, complementary cap and body sections each flex with respect to each other at points spaced longitudinally of the spring. For instance, in the body the sections 7 and 8 flex with respect to each other about the pivoted connections resulting from tongues 13 in co-operating recesses 2. When the cap member 23 is appled and the cover flexes in response to spring movement, the flexure in the cap is at points 27—27 which coincide with the pivotal flexure in the body sections and thus there are no forces acting during the flexure of the cover which would tend to displace the cap sections with respect to their complementary body sections and the entire resulting structure is one where the flexing and pivoting action occur at the same points longitudinally of the spring.

Although I have described one form of my invention in considerable detail, it will be understood that numerous changes or variations may be made therein without departing from the scope of the invention as defined in the appended claims.

I claim:

1. A metallic spring cover for laminated vehicle springs comprising a series of channular sections spaced slightly from each other at their adjoining edges, a connector strip arranged within said sections and proportioned to overlap said adjoining sections, means at the end of said connector strip and adjacent the adjoining edges of said sections to secure said sections to each other comprising apertures formed in said sections and co-operating prongs carried by said strip interlocked with said apertures.

2. A metallic spring cover for laminated vehicle springs comprising a series of channular sections proportioned to cover three sides of a vehicle spring having a rectangular cross section, said sections spaced slightly from each other at their adjoining edges, a connector strip arranged within said sections and proportioned to overlap said adjoining sections, means at the end of said connector strip and adjacent the adjoining edges of said sections to secure said sections to each other comprising apertures formed in said sections and co-operating prongs carried by said strip interlocked with said apertures, each of said sections provided with a latching device adjacent the free edges thereof and a one-piece spring cover cap section proportioned to cover the fourth side of a vehicle spring, said cap section having means adapted to co-operate with said first mentioned latching devices.

3. A spring cover comprising a series of separable spaced channular body sections, means to flexibly connect adjacent sections of said series comprising a strip proportioned to overlap the space between said sections having prongs projecting from each end thereof extending through co-operating apertures in adjoining sections whereby the sections may be moved with respect to each other and with respect to said strip through said prongs and aperture interlock.

4. A spring cover comprising a series of spaced channular sections, means to connect said sections to each other and overlap the space therebetween comprising a strip having a pair of integral prongs at each end thereof, each of said sections provided with a pair of apertures adjacent their adjoining edges and one of the prongs of said pair arranged to extend through one of said apertures in one section and the other prong of said pair arranged to extend through an aperture in the next adjacent section whereby said sections may flex with respect to each other and with respect to said strip through said prong and aperture connection.

5. A spring cover for flexible leaf springs comprising a series of spaced channular sections, means to connect said sections to each other and overlap the space therebetween comprising a strip having a relatively wide terminal portion at each end thereof and a relatively narrow section intermediate said terminal portion, each of said terminal portions provided with a pair of prongs, the adjacent edges of the adjoining sections of said series each provided with a pair of apertures, one of the prongs of said pair adapted to be arranged in one of the apertures of one section and the other prong of said pair adapted to be arranged in one of the apertures of the adjoining section, said narrow strip portion intermediate the ends thereof proportioned to overlap and cover the space between said adjoining sections whereby said sections may flex with respect to each other and with respect to said strip in response to spring movement without exposing the spring through the space between adjacent sections.

6. A spring cover comprising a plurality of U-shaped body sections formed with apertures in the free corner portions thereof and arranged with their contiguous edges in spaced relation, means to connect said sections to each other comprising a strip arranged within said sections and proportioned to overlie the edges of adjacent pairs of said sections and provided with means at the ends thereof extending respectively through said apertures in each pair of adjacent sections.

GEORGE W. CRABTREE.